G. S. BOYLAN.
WINDING REEL.
APPLICATION FILED APR. 4, 1917.

1,263,640.

Patented Apr. 23, 1918.
2 SHEETS—SHEET 1.

WITNESSES

INVENTOR
G. S. Boylan
BY Victor J. Evans
ATTORNEY

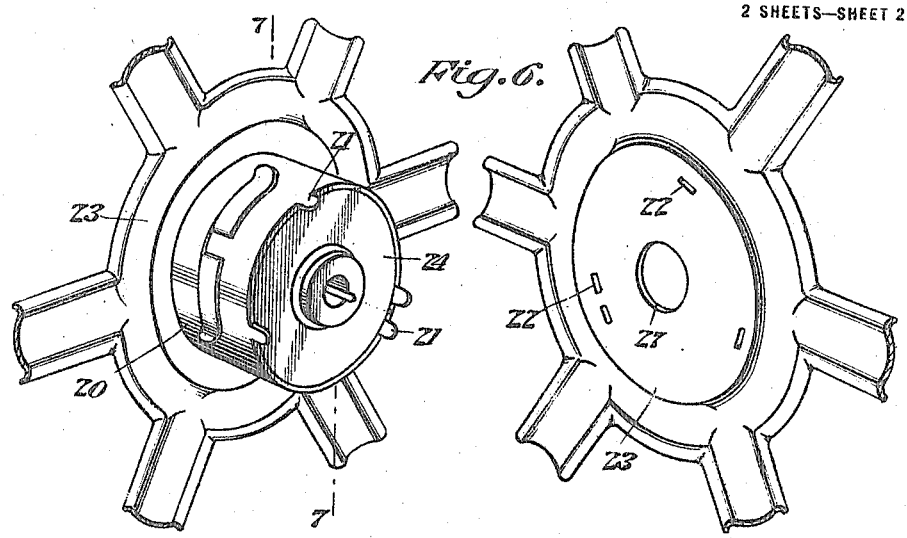
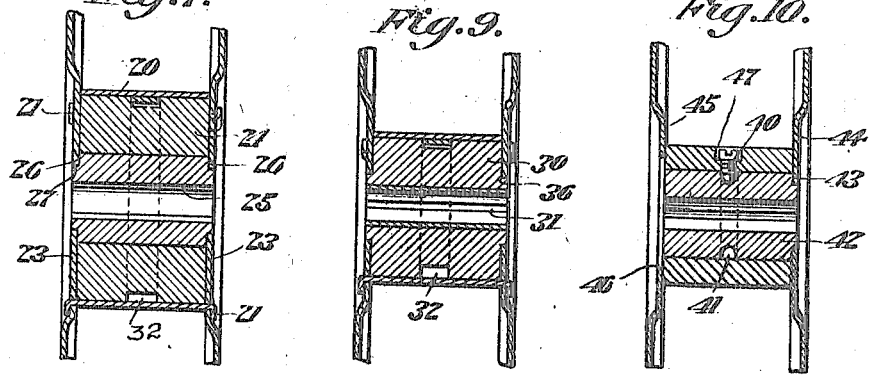
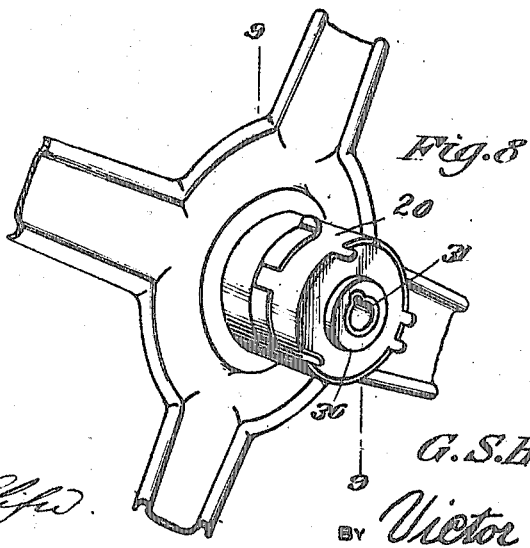

UNITED STATES PATENT OFFICE.

GOVE S. BOYLAN, OF SALISBURY, NORTH CAROLINA, ASSIGNOR OF ONE-HALF TO GEORGE R. COLLINS, OF SALISBURY, NORTH CAROLINA.

WINDING-REEL.

1,263,640.

Specification of Letters Patent.  Patented Apr. 23, 1918.

Application filed April 4, 1917.  Serial No. 150,757.

*To all whom it may concern:*

Be it known that I, GOVE S. BOYLAN, a citizen of the United States, residing at Salisbury, in the county of Rowan and State of North Carolina, have invented new and useful Improvements in Winding-Reels, of which the following is a specification.

This invention relates to winding and reeling, and more especially to film spools or reels for moving picture machines; and the object of the same is to improve the construction of such a reel and particularly its hub, to the end that under certain circumstances a slight slippage or lost motion may occur between the reel and the shaft on which it is mounted.

This object is carried out by the present invention which consists broadly in mounting the hub proper or core of the spool frictionally upon a bushing, which in turn is mounted on the shaft; and specifically by various details in the structure of parts, all as hereinafter more fully described and claimed and as shown in the drawings wherein:—

Fig. 6 is a perspective view of another type of this invention with one of the heads of the reel slightly removed, and Fig. 7 is an enlarged cross-section on the line 7—7 of Fig. 6.

Fig. 8 is a perspective view of still another type of this invention with one head omitted, and Fig. 9 is an enlarged cross-section on the line 9—9 of Fig. 8 with both heads in place.

Fig. 10 is a sectional view of yet another type of this invention.

The film reel forming the subject matter of the present invention includes in all cases two ends or heads of ample size and usually of skeleton formation, a core or hub connecting their centers and on which the film is wound, a clip on the hub for holding the end of the film, a sleeve or more properly a "bushing" rotatably mounted with some degree of friction within the bore of the hub, and means for holding it against axial displacement therefrom while yet permitting the separation of parts when desired. The broad principle of the present invention lies in the fact that the bushing is not rigidly fitted within the hub although it may be and usually is fixed upon the shaft which rotates it. My purpose is to permit this hub and therefore the reel as a whole to rotate around or to slip upon the bushing at times, as more fully explained below; and, while I have herein described a number of details with respect to various parts which may be employed and have illustrated several types of the invention, I do not wish to be limited thereby in respect of the principle of operation and the underlying function and purpose of the invention.

Figure 1:
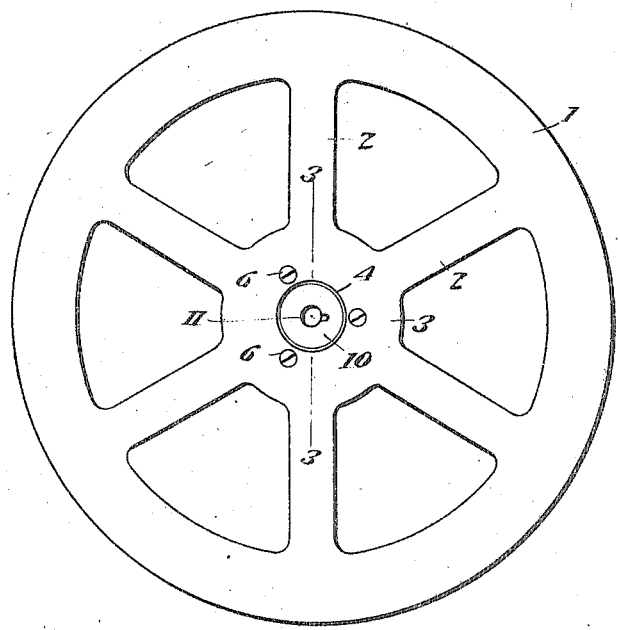
Figure 1 is an end view of a complete reel or spool, illustrating one type of this invention.
Figure 3:
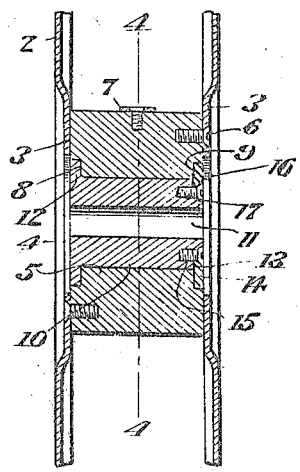
Fig. 3 is a transverse section on about the line 3—3 of Fig. 1.

Referring first more particularly to Figs. 1 to 5 inclusive, the reel-heads are herein shown of skeleton formation, each preferably stamped from sheet metal and comprising a rim 1 connected by spokes 2 with the hub or annulus 3 having an ample opening 4 at its center, and the two heads may be stamped from a single pair of dies as they are exact duplicates of each other. The core or hub proper, 5, is by preference peripherally smaller that the contour of each annulus 3, and it has quite an ample bore which in turn is smaller than the opening 4 through the annulus so that the latter in no way interferes with the insertion and removal of the bushing yet to be described. The reel heads are held to the ends of the hub by screws or other devices 6 passing through holes in each annulus and into the end of the hub body as best seen in Fig. 3. At an appropriate point on its periphery the hub carries a fastening device or clip 7 to which the extremity of the film is attached in a well-known manner, and in Fig. 4 this clip is shown as passing around a considerable portion of the periphery and as having two fingers so that the film may be attached to either side of the core or hub. The bore of the hub is strictly cylindrical and of course strictly concentric with its axis, and each end of the bore is counterbored or enlarged to produce rabbets indicated at 8 and 9 in Fig. 3, for a purpose yet to be set forth.

Figure 2:
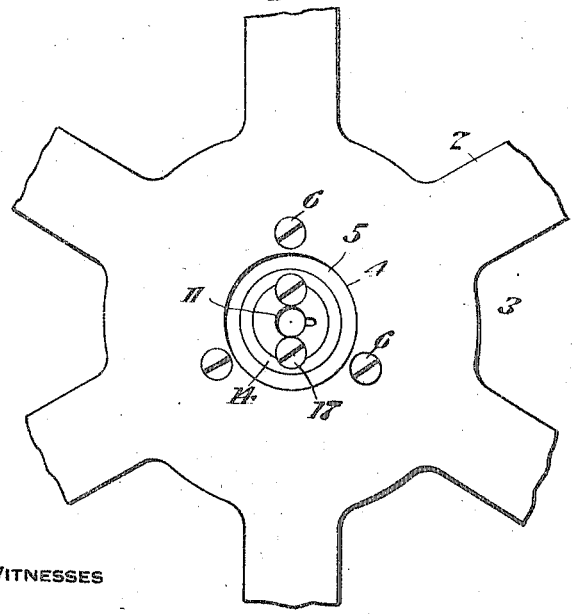
Fig. 2 is an enlarged end elevation of the parts at the center of Fig. 1, viewed from the opposite side of the latter.
Figure 4:
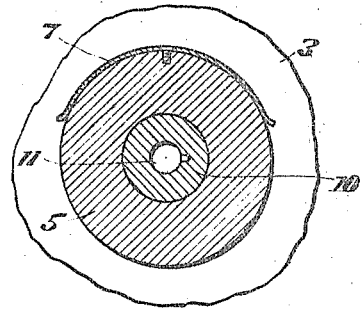
Fig. 4 is a cross-section on the line 4—4 of Fig. 3.
Figure 5:
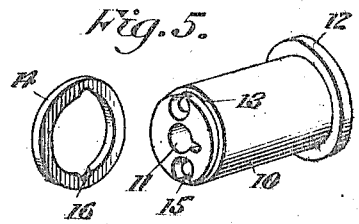
Fig. 5 is a perspective view of the bushing removed, including a detail of the ring slightly removed from the reduced end of the bushing.

The bushing best seen in Fig. 5 has a body 10 which is externally cylindrical and of a size to fit closely within the bore of the hub with some considerable friction, and the bore 11 of the bushing is adapted to be mounted on a shaft and attached thereto in any suitable manner, as for instance by a spline engaging the key-way shown herein. At one end the bushing is enlarged or flanged as at 12 to fit the counterbore or rabbet 8 as seen in Fig. 3, and at its other end the body 10 of the bushing is cut away or rabbeted as at 13 to receive a ring 14 which when in place produces in effect a similar flange at this end of the bushing, adapted to fit within the counterbore or rabbet 9 as seen in Fig. 3. This ring may be held removably in the rabbet of the bushing by any suitable means, but as shown I have provided the extremity of the bushing with sockets 15 and the inner periphery of the ring with notches 16 adapted to register therewith, and screws 17 may be passed into the sockets with their heads engaging the notches as best seen in Fig. 2. The opening 4 at the center of the annulus 3 of the reel-heads is sufficiently large to permit the insertion and removal of these screws without necessitating the removal of either head from the core or hub 5. While it is intended that the friction between the bore of the hub and the periphery of the bushing shall accomplish the objects set forth below, it is quite possible to set up the screws 17 and bear the ring into frictional contact with one end of the hub and simultaneously draw the flange 12 into frictional contact with the other end of the hub, so that the aggregate friction between the hub and the bushing is thereby slightly increased. I do not ordinarily take advantage of this fact but it is contemplated and it is included within the spirit of the invention.

The type of the invention shown in Figs. 6 and 7 includes generally the same members and need not be described in detail except as to points wherein it differs from the type already described. The hub 20 is here a sheet metal shell, having tangs 21 at its ends passing through slits 22 in each annulus 23 and bent over on the outside of the latter, and the hub-body is a filler 24 as of wood or the like which may fit rather tightly within the sheet metal shell 20 and may be fastened therein against rotation or may itself slip therein with a slight degree of friction if desired. Through the bore of this filler passes the body 25 of the bushing which necessarily fits therein with the friction above described and for the purpose yet to be set forth. Both ends of the body are cut away or rabbeted as at 26, but the ring 14 of Fig. 5 is not here employed. I purposely reduce the size of the opening 27 in each annulus 23 so that the inner periphery of such annulus enters the rabbet 26 of the bushing and prevents the latter from axial displacement. There will be little or no friction between the annulus and the end of the bushing in this construction.

In the type of my invention shown in Figs. 8 and 9, substantially the same sheet metal shell with its tangs and fastening means is employed, and the filler 30 is of a size to fit within the bore of this hub. The bushing is shown relatively somewhat thinner than in Figs. 6 and 7, and it is possible to make this bushing of metal in the form of a sleeve 31 to closely engage the shaft. In Fig. 9 I show the filler 30 as provided with an annular groove 32 whose principal purpose is to permit the fastening device for the clip to travel therein in case it projects through the sheet metal hub. I might here say that such a groove could be provided in the filler 24, as at 32' in Fig. 7, but it forms no part of the invention. The filler 30 in this type of my invention may be held in place by cutting it away so as to produce a rabbet 36 at each extremity and permitting the contiguous annulus to overlie the rabbet as shown and described with respect to the preceding type, although of course it is possible to hold it in place by the means described with respect to the first type and best seen in Fig. 3, and in this respect I do not wish to be limited.

The type of my invention shown in Fig. 10 is a slight departure from the others with respect to the means for holding the bushing in place, and as such it will doubtless require a thicker hub than one of sheet metal, although sheet metal might be used if it would carry a screw. The latter is here numbered 40, and it passes radially inward through the hub, with its tip preferably rounded and loosely entering a groove 41 which is formed around the bushing 42 at an appropriate point. I have shown one end of the bushing as provided with a rabbet 43, and the opening in the adjacent head is small enough to permit its annulus 44 to reach into said opening, but this is not necessary if the set screw be employed. I have accordingly shown the other head 45 with its opening 46 so large that this end of the bushing is not rabbeted. The principal purpose of the set screw is to prevent the axial displacement of the bushing, and in this function its tip serves more as a guide, its body being screw-threaded only for the purpose of enabling it to be readily taken out of the hub when desired. In order that it shall in no way interfere with the contour of the hub and the coiling of the film thereon, I countersink the head of the screw in a socket 47 within the hub as shown; and in order that its tip may not be accidentally set into contact with the bottom of the groove which would increase friction between the hub and bushing, I make the screw of such length that when its head rests in the countersink its tip travels freely within the groove.

The use of film reels is well known to those familiar with moving-picture apparatus. The feed reel with its roll of film is usually placed on the upper shaft, the film then led through the sprockets, an empty reel placed on and secured to the winding shaft, and the front end of the film led to and disposed beneath the clip on this winding reel. Now when the machine is set in motion the winding shaft rotates at a speed to cause the winding reel to draw the film through the sprockets precisely at the speed which the movement of such sprockets permits, and this speed is of course constant. Very soon the accumulated convolutions of the film on the lower reel increase its size, and subsequent rotations therefore tend to draw increasing stretches of reel through the sprockets. While various attempts have been made to meet this contingency, the gist of my present invention lies in the frictional mounting of the reel-hub upon the sleeve which is fast on the winding shaft. It is obvious that if the hub were keyed to the shaft it would be compelled to rotate therewith, no matter what the size of the roll contained upon it: but when it is frictionally mounted thereon, or rather on a bushing carried by the shaft, the increasing tension of the film between this reel and the sprockets occasions a little slippage from time to time and tearing of or injury to the film is prevented.

Meanwhile the reverse is true of the feed reel, because when it commences to rotate it is largest, being at this time full of the convolutions of the film. Provision is made for this emergency, however, by the usual application of a brake or tension means to retard the rotation of this reel so that it will feed the film only as fast as drawn from it by the sprockets. But here again my invention is useful because—no matter how the bushing in this reel is mounted on the shaft or what the speed of the latter or how strong the brake applied thereto—slippage is permitted which will prevent the destruction of the film. Having drawn the film from the feed reel onto the winding reel, it must be rewound before it can be used again. One of my improved reels is therefore placed in the rewinding machine, and the rear end of the film led to and passed under its clip. The rewinder is now set in motion, and again the advantage of my invention is obvious. If the rewinder reel should rotate more rapidly than the film runs off the other reel, slippage occurs in one or both and destruction of the film is avoided.

These reels may be put onto and taken off of the several shafts mentioned by slipping the bore of the bushing over the shaft and fastening it thereto in any appropriate manner, and for this purpose the end of the shaft is usually left free. I do not wish to be limited to the use of a spline and groove connection, as this forms no part of this invention. It may become necessary at times to take off one or both heads of the reel, and this can be accomplished in any type of my invention. Also it may become desirable to replace a bushing, hub, or filler, and this can be accomplished in a manner which will be clear from the above description. I do not wish to be limited to the materials or proportions of parts, and further details are not essential.

Attention is now invited to the general results which follow from the use of this invention on the ordinary moving-picture machine, and more especially the winding reel thereof. When the film is first threaded through the machine and attached to the winding reel, the latter has nothing on its core or hub and its weight is trifling. The winding shaft is now set in motion, and during the first few revolutions there is practically no necessity for any slippage of the hub on the bushing because the reel winds the film at the same rate that the latter passes through the sprockets. As the roll increases in size on the reel, there eventually comes a time when the tension on the film requires the hub to slip a little. At first this will occur once in perhaps four or five revolutions, and later in three or four revolutions. Gradually it increases until eventually we may assume there is a slippage every revolution, and then twice and three and four times in a revolution. Finally, as the roll approaches the size of the periphery of the reel, the slippage becomes constant, and it increases with increasing rapidity until the complete film is wound thereon. Meanwhile the weight of this reel and the roll carried thereby is also constantly increasing, but increasing steadily. As the weight increases, of course the friction of the hub on the bushing increases. This is quite desirable, because obviously a heavier reel requires more power to rotate it than a lighter one. Yet at the time when the slippage increases in frequency and finally when it becomes constant the slippage prevents the application of excessive power and the fact that the slippage is constant prevents any jerking on the film which would tend to injure it. I have found by practical experiment that this attachment is ideal when applied to the ordinary moving-picture machine.

What is claimed as new is:—

1. In a winding reel, the combination with two heads, each comprising a rim, spokes, and a central annulus; of a tubular hub, means for detachably securing it concentrically between and to said annuli, and a bushing fitting frictionally and rotatably within the hub, the bushing adapted to be mounted on a shaft.

2. In a winding reel, the combination with a tubular hub, two heads each having a central opening smaller than the bore of the hub, and means for attaching the heads removably to the ends of the hub; of a bushing fitting frictionally and rotatably within the bore of the hub and held against axial displacement therefrom by said heads.

3. In a winding reel, the combination with a tubular hub, two heads each having a central opening smaller than the bore of the hub, and means for attaching the heads removably to the ends of the hub; of a bushing fitting frictionally and rotatably within the bore of the hub and having rabbets around its ends engaged by said heads around their openings, for the purpose set forth.

4. In a film winding reel, the combination with two heads each having a central annulus provided with an opening and with slits around the same, and a hub between the heads having tangs engaging said slits; of a bushing fitting frictionally and rotatably within the bore of the hub and held against axial displacement therefrom by said heads.

5. In a winding reel, the combination with a rotatable driving element; of two heads, and a two-part hub connecting them and comprising a shell attached to both the heads and a filler within the shell and frictionally mounted on said element.

6. In a winding reel, the combination with a rotatable driving element; of two heads, and a two-part hub connecting them and comprising a shell rigidly attached to both the heads and a filler mounted frictionally within the shell and frictionally on said element.

7. In a winding reel, the combination with two heads, and a two-part hub connecting them and comprising a shell and a tubular filler within it; of a bushing frictionally and rotatably mounted within the filler.

8. In a winding reel, the combination with spaced heads, and a shell disposed concentrically between and detachably connecting them; of a tubular filler frictionally mounted within the shell, and a bushing frictionally mounted within the filler.

9. In a winding reel, the combination with spaced heads having central openings, and a shell disposed concentrically between and detachably connecting said heads; of a tubular filler frictionally mounted within the shell and inclosed between said heads, and a bushing frictionally mounted within the filler and having rabbets at its ends engaged by said heads around their openings.

In testimony whereof I affix my signature.

GOVE S. BOYLAN.

Witnesses:
THEO. R. COLLINS,
N. L. COLLAMER.